United States Patent
Taylor et al.

(10) Patent No.: US 8,428,235 B2
(45) Date of Patent: Apr. 23, 2013

(54) TELEPHONE CALL PROCESSING

(75) Inventors: Martin Taylor, Middlesex (GB); Paul Brittain, Middlesex (GB)

(73) Assignee: Metaswitch Networks Ltd, Enfield (GB)

( * ) Notice: Subject to any disclaimer, the term of this patent is extended or adjusted under 35 U.S.C. 154(b) by 817 days.

(21) Appl. No.: 12/563,023

(22) Filed: Sep. 18, 2009

(65) Prior Publication Data

US 2010/0142694 A1    Jun. 10, 2010

(30) Foreign Application Priority Data

Dec. 4, 2008  (GB) .................................... 0822150.9

(51) Int. Cl.
*H04M 3/42* (2006.01)
*H04M 7/00* (2006.01)

(52) U.S. Cl.
USPC ............ 379/201.12; 379/201.01; 379/201.02; 379/221.13

(58) Field of Classification Search ............. 379/201.12, 379/211.02, 201.03, 201.01, 201.02, 212.01, 379/219, 221.13, 201.05
See application file for complete search history.

(56) References Cited

U.S. PATENT DOCUMENTS

| | | | |
|---|---|---|---|
| 6,853,714 B2 * | 2/2005 | Liljestrand et al. | 379/201.03 |
| 2005/0213740 A1 * | 9/2005 | Williams et al. | 379/211.02 |
| 2008/0069327 A1 * | 3/2008 | Kingsley et al. | 379/201.03 |

* cited by examiner

*Primary Examiner* — Thjuan K Addy
(74) *Attorney, Agent, or Firm* — Baker & Hostetler LLP (57) ABSTRACT

Embodiments of the present invention, include provision of enhanced telephony services for telephone calls received at local telephone exchange switches which do not themselves support identification of enhanced telephony service users and the associated triggering to initiate the provision of enhanced telephony services. Using a supported number portability mechanism, local telephone exchange switches allow provision of enhanced telephony services.

13 Claims, 12 Drawing Sheets

TELEPHONE CALL PROCESSING

CROSS-REFERENCE TO RELATED APPLICATIONS

This application claim priority under 35 U.S.C. §119(a) to GB Application No. 0822150.9 filed on Dec. 4, 2008, the entire disclosure of which in hereby incorporated by reference.

BACKGROUND OF THE INVENTION

1. Field of the Invention

This application relates to a method and apparatus for processing telephone calls in a telecommunications network. In particular, but not exclusively, the application relates to the delivery of enhanced telephony services for calls received on local telephone exchange switches.

2. Description of the Related Technology

Local telephone exchange switches deliver telephony services to residential and business customers, including a variety of functions that enable such customers to control the behavior of incoming and outgoing telephone calls; for example, call forwarding services, whereby the customer can request that calls to their telephone number be diverted to some other telephone number.

Some users of telephony services desire more sophisticated control over the behavior of telephone calls than is commonly provided by the majority of local telephone exchange switches that are deployed in the Public Switched Telephone Network (PSTN). An established technique for the delivery of such enhanced telephony services is to make use of a capability that is offered by some local telephone exchange switches known as Advanced Intelligent Network (AIN). By means of AIN, calls to specific numbers served by the local telephone exchange switch can trigger a query that is sent to an external computing system, and the response provided by this computing system can be interpreted by the local telephone exchange switch so as to determine how to treat the call. Commonly, the call is re-directed to another system which provides the means to play announcements, collect digits dialed by the caller, re-direct the call to the originally-called number or to some other destination, release the call, etc.

Some existing local telephone exchange switches do not provide the ability to generate at least some types of AIN queries that are triggered by incoming or outgoing calls. It would therefore be desirable to provide techniques whereby a wide range of enhanced telephony services can be delivered to customers connected to such existing local telephone exchange switches.

SUMMARY OF CERTAIN INVENTIVE ASPECTS

In accordance with a first aspect of the present invention, there is provided a method for providing an enhanced telephony service in a telecommunications network, the method comprising:

maintaining a store of identifiers for enhanced telephony service users in the network;

receiving a first message caused by a number portability query relating to a first telephone call in the network, the first message comprising a first identifier for the first telephone call;

searching the store for an identifier corresponding to the first identifier to identify a user of an enhanced telephony service;

in response to the searching identifying a user of an enhanced telephony service, instructing routing of the first telephone call to a first node in the network responsible for the provision of a first enhanced telephony service, the first enhanced telephony service being a service other than a number portability service.

Hence, by use of embodiments of the present invention, enhanced telephony services may be provided in relation to telephone calls received at local telephone exchange switches which do not themselves support identification of enhanced telephony service users and associated triggering to initiate the provision of enhanced telephony services. Such local telephone exchange switches do generally support a number portability mechanism, which are used of in order to allow provision of enhanced telephony services.

The instructing may comprise generating a second message identifying the first node in the network where the first enhanced telephony service can be provided. Hence, instead of routing a call to a subscriber's telephone line, a local telephone exchange switch may instead route the call to an enhanced telephony services node at which enhanced telephony services may be applied to or arranged for the call.

The first message may comprise a number portability query message. Hence, number portability queries can be intercepted and analyzed to determine whether the call is associated with an enhanced telephony services user.

The method may further comprise in response to the searching not identifying a user of an enhanced telephony service, transmitting a number portability query to a node in the network capable of processing number portability queries to identify number portability service users. Hence, if a call is not associated with an enhanced telephony services user, a number portability query can be processed further and the local telephone exchange switch informed as to whether the line associated with the call has been ported or not.

In some embodiments, the method comprises configuring a local telephone exchange switch to generate number portability queries for telephone calls it receives, wherein the first telephone call is received at the configured local telephone exchange switch. Hence, it is possible to determine whether enhanced telephony services should be applied to any call received at the local telephone exchange switch.

The first message may be received from the configured local telephone exchange switch.

In some embodiments, the method comprises further configuring the local telephone exchange switch to alter a network address to where the local telephone exchange switch transmits number portability queries.

Hence interception of number portability queries may be achieved by altering one or more configuration settings on a local telephone exchange switch.

Alternatively, the first message comprises a number portability response, the response being received on its way from a node in the network capable of processing number portability queries to identify number portability service users. Hence, instead of or in addition to intercepting number portability queries, number portability responses may be intercepted in order to determine whether to apply enhanced telephony services to a call.

In some embodiments, the first telephone call is an incoming call and the first identifier is associated with the called party for the call.

Alternatively, the first telephone call is an outgoing call and the first identifier is associated with the calling party for the call.

Hence, enhanced telephony services may be applied to both calls incoming to and calls outgoing from a local telephone exchange switch.

In some embodiments, one or more of the first identifier and the store of identifiers comprise a telephone dialing number.

In some additional embodiments, method comprises in response to the searching identifying a user of an enhanced telephony service, instructing routing of the first telephone call to a second node in the network for the provision of a second enhanced telephony service. Hence, more than one enhanced telephony service may be applied to a single call at more than one network location. The second enhanced telephony service may be a different enhanced telephony service to the first enhanced telephony service not provided by the first node. The second enhanced telephony service may include a number portability service, which may be provided for a user whose telephone number has been ported and is also a user of other enhanced telephony services.

The enhanced telephony service may comprise one or more of: call forwarding, call rejection, selective call forwarding, selective call rejection, selective all acceptance, call screening, incoming call notification, simultaneous ring, find me/follow me, and, customized ringback tones.

Hence, the embodiments of present invention allows a wide variety of different enhanced telephony services to be provided. For example, calls may be forwarded to a different telephone according to rules applied to the identity of the caller and/or the time of day or date, calls may be sent selectively to multiple telephones in parallel or in sequence, calls may be sent directly to a messaging system while providing the called party with the means to hear the message being left with the option to connect to the caller, etc.

In accordance with a second aspect of the present invention, there is provided a system for providing an enhanced telephony service in a telecommunications network, the system comprising:

means for maintaining a store of identifiers for enhanced telephony service users in the network;

means for receiving a first message caused by a number portability query relating to a first telephone call in the network, the first message comprising a first identifier for the first telephone call;

means for searching the store for an identifier corresponding to the first identifier to identify a user of enhanced telephony service;

means for, in response to the searching identifying a user of an enhanced telephony service, instructing routing of the first telephone call to a first node in the network responsible for the provision of a first enhanced telephony service, the first enhanced telephony service being a service other than a number portability service.

In accordance with a third aspect of the present invention, there is provided a method for providing an enhanced telephony service in a telecommunications network comprising a local telephone exchange switch capable of interworking with a telephone call control node remote to the local telephone exchange switch according to an existing interworking function, the method comprising the steps of:

maintaining a store of identifiers for enhanced telephony service users in the network;

reconfiguring the existing interworking operation to include an additional enhanced telephony service initiation function;

in response to receiving a telephone call at the local telephone exchange switch, triggering the reconfigured interworking operation;

during the reconfigured interworking operation, searching the store for an identifier corresponding to the received telephone call to identify a user of an enhanced telephony service;

in response to the searching identifying a user of an enhanced telephony service, instructing routing of the received telephone call to a node in the network responsible for providing an enhanced telephony service.

Hence, by use of embodiments of the present invention, enhanced telephony services may be provided in relation to telephone calls received at a local telephone exchange switch which does not itself support identification of enhanced telephony service users, but is configurable to interwork with a telephone call control node to detect when enhanced telephony services should be applied to a telephone call and route the call accordingly. This may involve reconfiguring an existing interworking operation such as the Local Number Portability mechanism so that enhanced telephony services are supported.

In accordance with a fourth aspect of the present invention, there is provided a method for providing an enhanced telephony service and a number portability service in a telecommunications network, the method comprising:

receiving a message caused by a number portability query, the message identifying a user;

identifying whether the user is registered to receive the enhanced telephony service;

if the user is so registered, providing the enhanced telephony service;

if the user is not so registered, providing the number portability service.

In accordance with a fifth aspect of the present invention, there is provided a computer program product comprising a computer-readable medium having computer readable instructions recorded thereon, the computer readable instructions being operative, when performed by a computerized device, to cause the computerized device to perform the method of the first, third and fourth aspects of the present invention.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
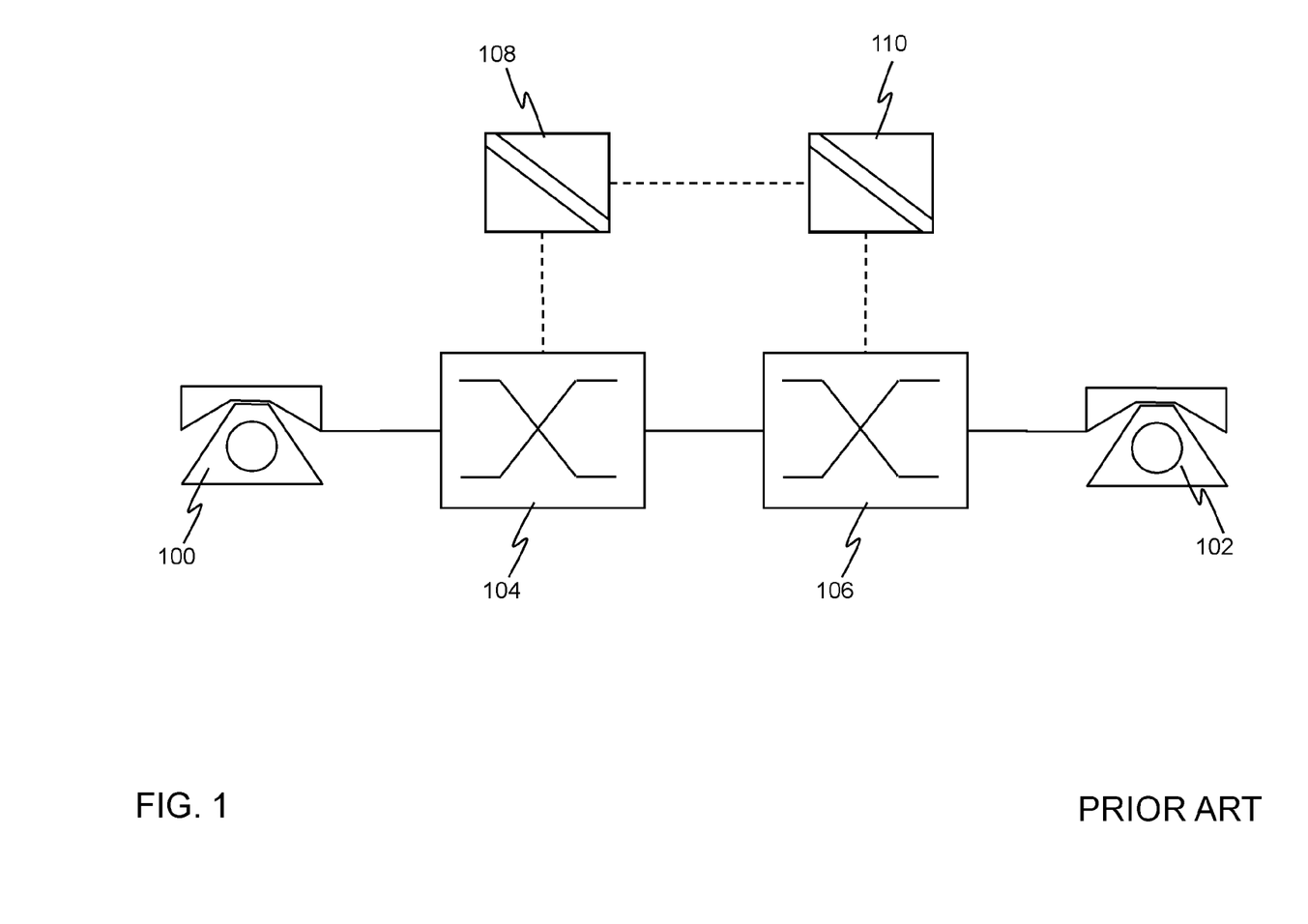
FIG. 1 is a diagram showing a telecommunications network according to the prior art.

FIG. 1 is a diagram showing a telecommunications network according to the prior art. FIG. 1 shows a common channel signaling network operating according to the Signaling System 7, which is commonly referred to as an SS7 network. Such an SS7 network separates the media path by which voice media, i.e. the voice payload for telephone calls, from the signaling path by which signaling information such as call setup information passes. In FIG. 1, voice media for a telephone call conducted between telephones 100 and 102, passes through telephone switches 104 and 106, whilst the signaling information passes from switch 104 to signaling transfer points 108 and 110 to switch 106, rather than along the media path between switches 104 and 106. FIG. 1 shows switches 104 and 106 connecting the call between telephones 100 and 102 across the network, although in reality more switches (not shown) may be involved. FIG. 1 shows signaling transfer points (STPs) 108 and 110 transferring the necessary signaling information for the telephone call across the network, although in reality more STPs (not shown) may be involved. Although freeing up connections between switches for the flow of call media data compared to previous network configurations, a basic SS7 network has limited capabilities in terms of providing enhanced telephony services.

Figure 2:
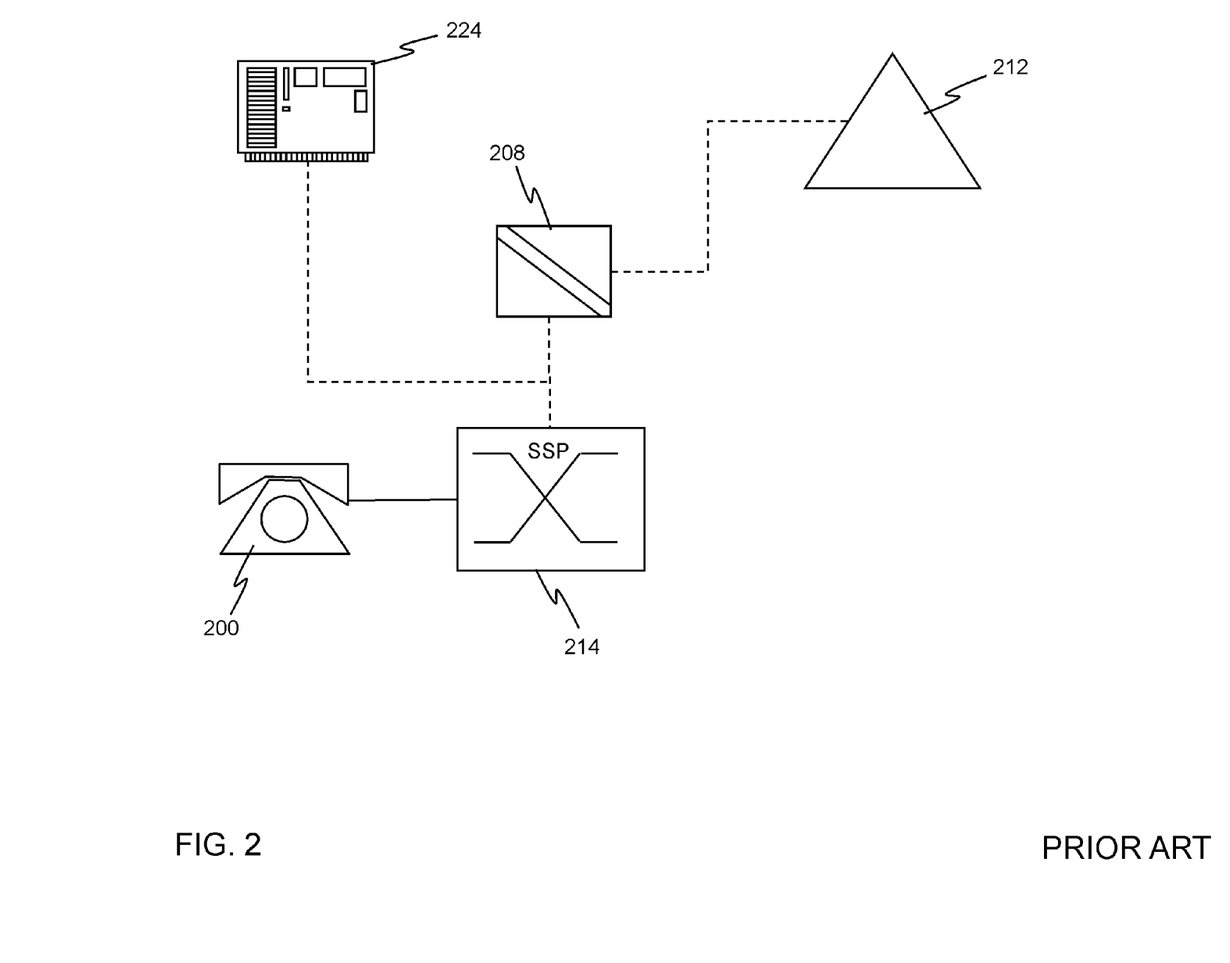
FIG. 2 is a diagram showing a telecommunications network according to the prior art.

FIG. 2 is a diagram showing a telecommunications network according to the prior art. In this network, an enhanced telephone switch known as a Service Switching Point (SSP) allows enhanced telephony services such as Advanced Intelligent Network (AIN) services to be provided on telephone calls that are received at the SSP. When a user of telephone 200 makes or receives a call, SSP 214 detects whether the user has enhanced telephony services enabled, for example by reference to an enhanced telephony service identifier associated with the user's telephone line such as an AIN trigger. An enhanced telephony service identifier may include the enhanced service user's telephone number. Once the SSP detects that the user is an enhanced telephony services user, the SSP contacts a node 212 responsible for handling enhanced telephony services in the network via STP 208.

Node 212 may be a service control point (SCP) which includes programmable data processing capabilities for control of one or more enhanced telephony services. Provision of enhanced telephony services may involve the SCP controlling an intelligent peripheral node 224 to provide enhanced resources for the call for example playing voice announcements or collecting DTMF tones from a user or suchlike. More than one enhanced telephony service may be provided by an intelligent peripheral node capable of providing multiple enhanced telephony services, or by several different intelligent peripheral nodes (not shown).

Many local telephone exchange switches are not provided with SSP enhanced functionality and are therefore unable to detect when SCP node 212 should be contacted in order to provide enhanced telephony services for a call. Embodiments of present invention provide methods and apparatus to provide enhanced telephony services to users connected to such local telephone exchange switches, despite the inability of the switches themselves to detect calls to and from such enhanced telephony services users and contact an SCP in such cases. Embodiments of the invention provide enhanced telephony services by use of number portability techniques which such local telephone exchange switches support. Such number portability techniques may include the Local Number Portability (LNP) mechanism, which is used hereinafter as an exemplary technique by which embodiments of the present invention may be implemented.

Almost all local telephone exchange switches provide a means to enable telephone numbers to be moved from one local telephone exchange switch to another, typically operated by another service provider. This is known as Local Number Portability (LNP). Local telephone exchange switches normally route telephone calls based on the first few digits of the dialed number. Prior to the introduction of LNP, these digits would have unambiguously identified the terminating local telephone exchange switch which served the customer to which the call was directed, thereby enabling the originating local telephone exchange switch and any intermediate switches to route the call correctly to the terminating local telephone exchange switch.

With LNP, local telephone exchange switches and intermediate switches can no longer determine the identity of the terminating local exchange switch to which the call should be routed by inspection of the first few digits of the dialed number. Instead, the switch must send a query to an external computing system which has access to a database that identifies the terminating local telephone exchange switch for each number that has been ported. The response from the external computing system to this query is either:

a) identification of the terminating local telephone exchange switch to which the dialed number has been ported by means of a Location Routing Number (LRN), or b) confirmation that the dialed number has not been ported and can therefore be routed based on its first few digits.

With the information provided in either of these responses, the local telephone exchange switch can route the call correctly.

Figure 3:
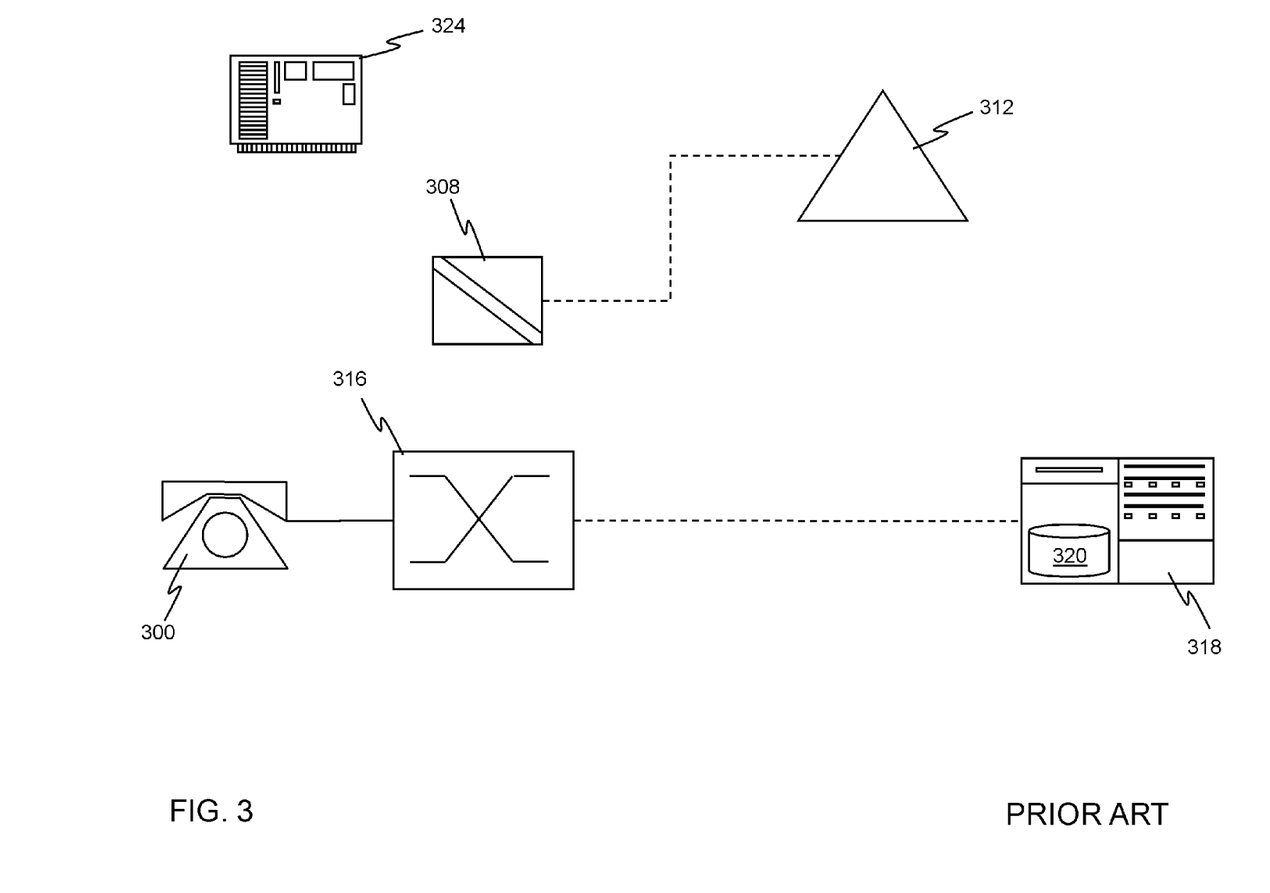
FIG. 3 is a diagram showing a telecommunications network according to the prior art.

FIG. 3 is a diagram showing a telecommunications network according to the prior art. Here, telephone switch 316 is able to generate LNP queries in response to receipt of telephone calls outgoing from telephone 300. Switch 316 transmits an LNP query containing a telephony service identifier for the call to LNP node 318. The telephony service identifier contained in the LNP query may include the telephone dialing number of the called party that the calling party using telephone 300 wishes to contact. When LNP node 318 receives such an LNP query, it consults database 320 containing details of which telephone numbers have been ported and which have not been ported. LNP node 318 then responds to the LNP query with an LNP response, informing switch 316 whether the telephony service identifier has been ported or not. LNP queries and LNP responses are defined herein as LNP messages. LNP messages may be relayed via one or more STPs such as STP 308.

Switch 316 of FIG. 3 is not provided with SSP functionality, so is unable to detect and trigger contact with SCP 312 via STP 308 and intelligent peripheral 324 in order to apply enhanced telephony services to telephone calls it receives. This situation is depicted in FIG. 3 via a lack of a physical connection between switch 316, intelligent peripheral 324 and STP 308, although in reality this may be a lack of a logical connection between switch 316, intelligent peripheral 324 and STP 308, i.e. although switch 316 is physically capable of talking to SCP 312 via the SS7 signaling network, it is unable to talk the necessary language to SCP 312 to invoke enhanced telephony services because it doesn't support AIN triggers.

Figure 4:
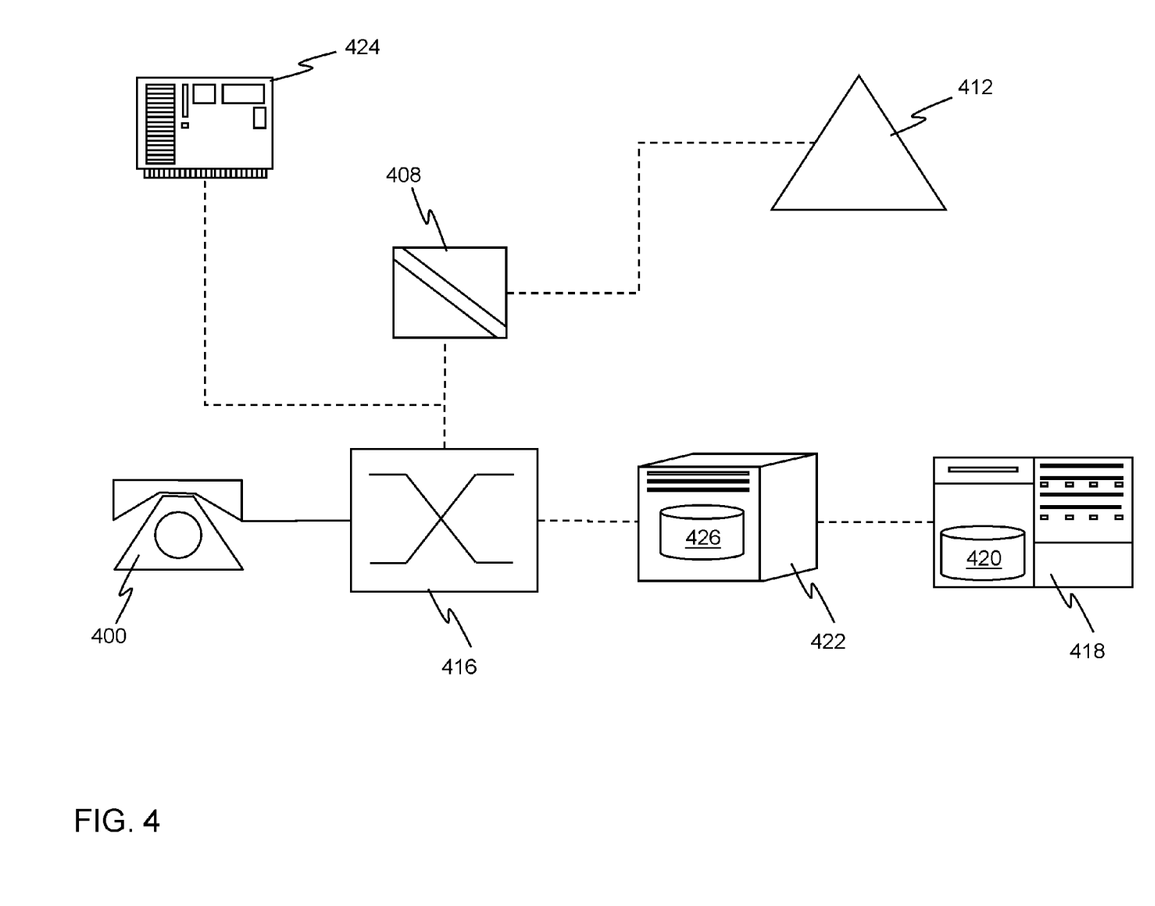
FIG. 4 is a diagram showing a telecommunications network according to an embodiment of the present invention.

FIG. 4 is a diagram showing a telecommunications network according to an embodiment of the present invention. FIG. 4 contains some similar entities to those shown in FIG. 3, namely telephone 400, local telephone exchange switch 416, STP 408, intelligent peripheral 424, SCP 412, LNP node 418 and LNP database 420. Here however, there is an additional entity 422 which intercepts LNP messages travelling to and from switch 416 and LNP node 418. Entity 422 is referred to herein as an intercept node, and may comprise an STP that is connected to the common channel signaling network, a softswitch, proxy server or other such entity with data processing and network interfacing capabilities. Intercept node 422 is able to process LNP messages, including receiving LNP queries from switch 416, relaying such LNP queries on to LNP node 418, receiving LNP responses from LNP node 418 and relaying such LNP responses on to switch 416.

When a local exchange switch wants to perform an LNP query, it formats a Transaction Capability Application Part (TCAP) message and sends it over the SS7 network to a specific point code (i.e. an SS7 network address) which corresponds to either an SCP that is capable of responding directly to the LNP query or an STP that can perform the required translation process to find the address of an SCP that is capable of responding to the LNP query. The translation process may for example be a Global Title Translation process according to network addresses defined in the Signaling Connection Control Part component of the SS7 protocol.

The LNP query point code is configured on the local telephone exchange switch. Further, the local telephone exchange node 416 can be configured to generate LNP queries to this point code for all telephone calls it receives. To allow interception of such queries, the local telephone exchange switch is re-configured so as to set the value of the LNP query point code to be the point code of the intercept node. The intercept node is configured with the LNP query point code of the real LNP node so that it can forward these queries on to the LNP node as and when necessary.

Intercept node 422 maintains a database 426 or has access to an external database (not shown) in which are stored a number of enhanced telephony service identifiers associated with users of enhanced telephony services in the network. Such enhanced telephony service identifiers may include the telephone dialing numbers of such enhanced telephony service users.

When the intercept node receives an LNP query, it extracts telephony service identifier data, for example the calling party or called party telephony dialing number, from the query and compares this to a list of enhanced telephony service identifiers, i.e. the telephony service identifier that is included in the query is compared with a list of enhanced telephony service identifiers that identify those lines served by the local telephone exchange switch to which enhanced telephony services are to be provided.

If the telephony service identifier included in the query corresponds to an entry in the list, the intercept node generates a response to the query that contains a specially-assigned value of LRN that does not correspond to a terminating local exchange switch, but instead signifies to the local exchange switch that this call should be routed to intelligent peripheral node 424 such that enhanced telephony services can be applied to the call.

If the telephony service identifier included in the query does not correspond to an entry in the list, the intercept node forwards the query on to LNP node 420. When the LNP node 420 sends its response to intercept node 422, intercept node 422 forwards this response (possibly unchanged) on to the local telephone exchange switch 416. Alternatively, LNP node 420 may send its response directly back to local telephone exchange switch 416 without intercept node 422 being further involved.

Local telephone exchange switch 416 may be configured to generate an LNP query for each and every call that it processes, both originating and terminating, and to send these queries to intercept node 422. Alternatively, local telephone exchange switch 416 may be configured to generate LNP queries only when a call terminates on certain groups or numbers or specific individual numbers served by the switch. Intercept node 422 may respond directly to such queries, or may transmit such queries to LNP node 418 which has access to LNP database 420. Local telephone exchange switch 416 is configured to recognize the specially-assigned value of LRN that may be returned by intercept node 422 in response to an LNP query, and to route calls associated with this value of LRN to intelligent peripheral 424 that applies the enhanced services, typically via a trunk that supports the ISDN Primary Rate Interface.

Intercept node 422 includes a means to detect looped queries, whereby a call routed to intelligent peripheral 424 is sent back to local telephone exchange switch 416, whereupon a new LNP query is launched to intercept node 422. In such circumstances, the response from intercept node 422 does not include the specially-assigned value of LRN, so that the call is routed by local telephone exchange switch 416 normally to the called number, and not sent again to the intercept node 422. This may involve analyzing a call identifier or suchlike, so that if multiple queries or responses are received with the same call identifier, then a looped query is detected and remedial action can be taken.

Figure 5:
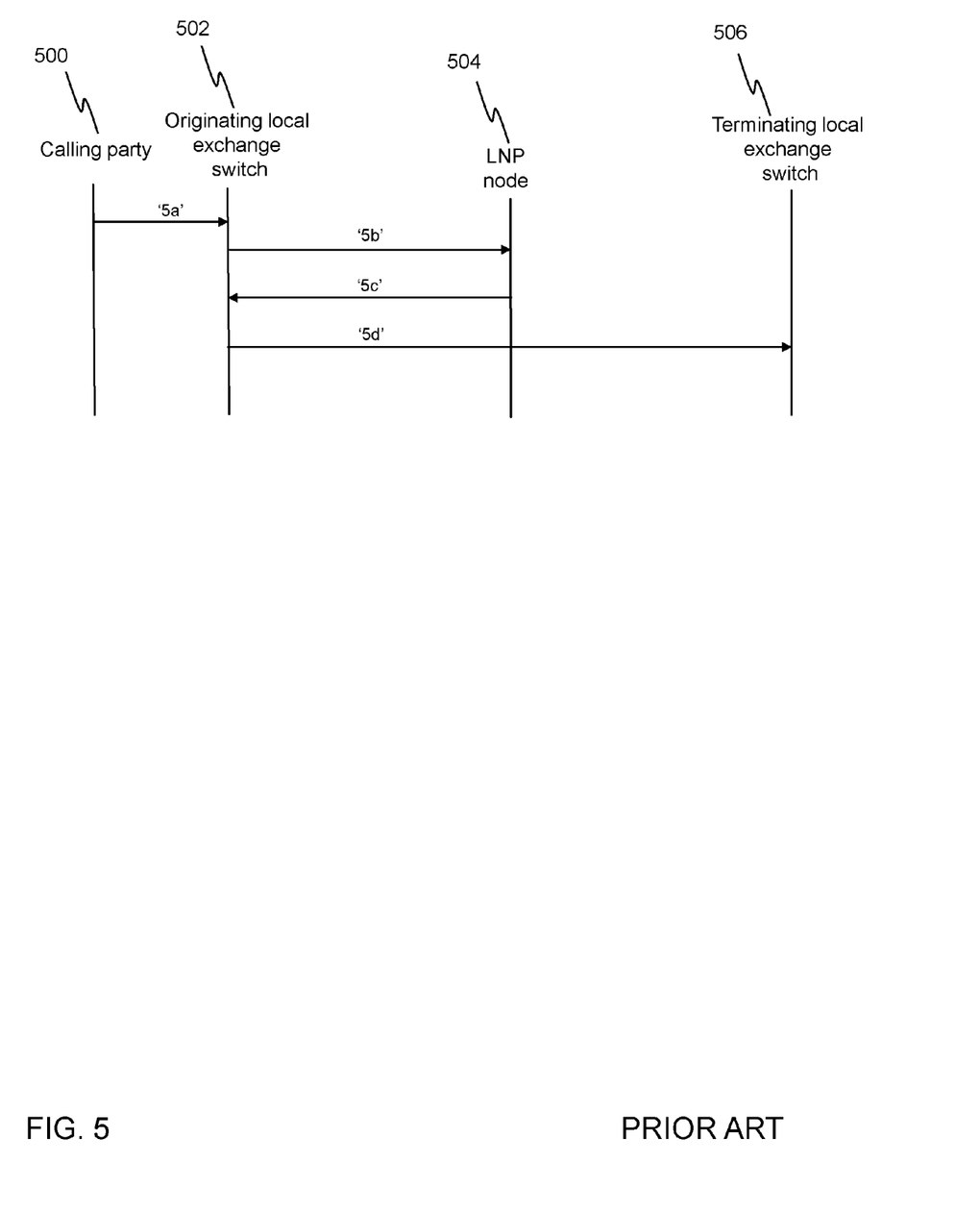
FIG. 5 is a signaling flow diagram showing an LNP query procedure according to the prior art.

FIG. 5 is a signaling flow diagram showing an LNP query procedure according to the prior art. When a calling party 500 makes a call, signaling information for the call is received at originating local telephone exchange switch 502, as shown by step 5a. Originating local telephone exchange switch 502 generates an LNP query message containing a telephony service identifier associated with the called party for the call and transmits this to LNP node 504 in step 5b. LNP node 504 determines how calls for the telephony line identified in the LNP query should be routed by accessing LNP database (not shown) and searching for corresponding entries. LNP node 504 transmits a suitable LNP response message to originating local telephone exchange switch 502 in step 5c. When originating local telephone exchange switch 502 receives the response from LNP node 504, originating local telephone exchange switch 502 and any intermediate switches (not shown) are able to route the call to the terminating local telephone exchange switch 506 which serves the called party for the call.

Figure 6:
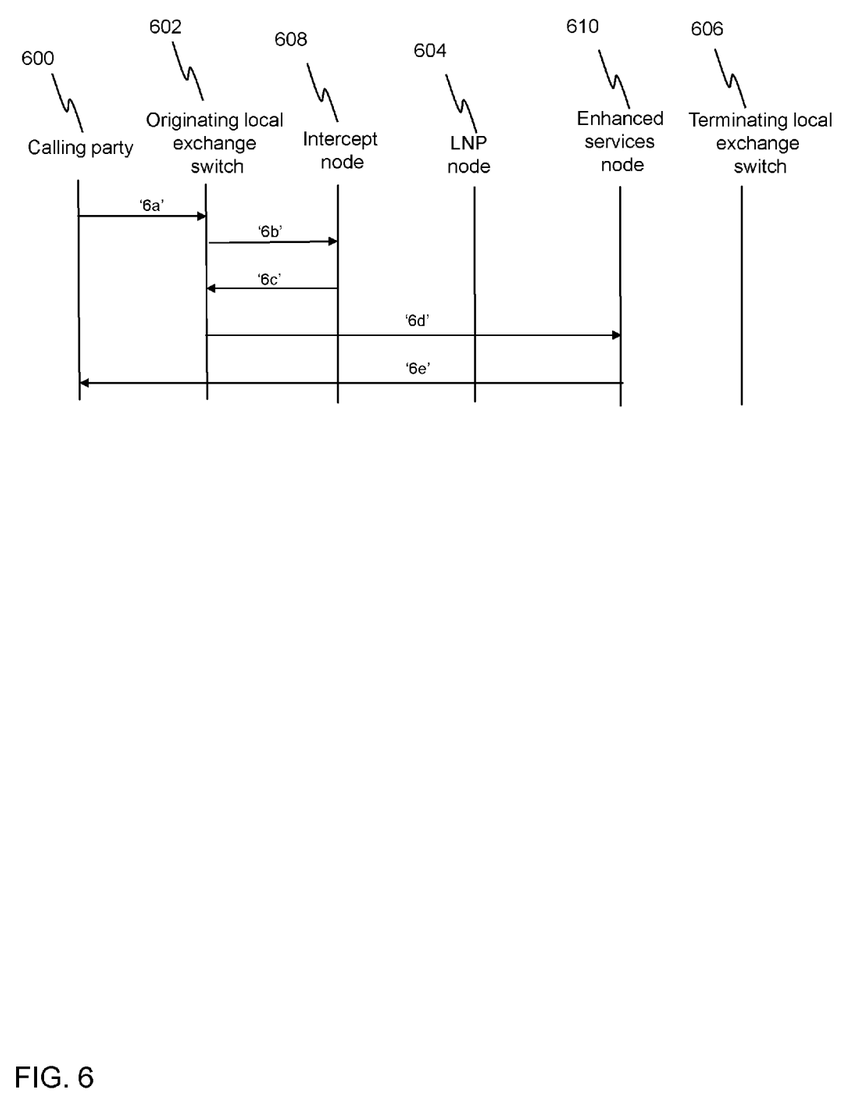
FIG. 6 is a signaling flow diagram showing a call processing procedure according to an embodiment of the present invention.

FIG. 6 is a signaling flow diagram showing a call processing procedure according to an embodiment of the present invention. This embodiment involves enhanced telephony services being applied to an originating call, i.e. an outbound call from calling party 600.

When a calling party 600 makes a call, signaling information for the call is received at originating local telephone exchange switch 602, as shown by step 6a. Originating local telephone exchange switch 602 is configured to generate LNP queries for all calls it processes and to send such queries to intercept node 608. Originating local telephone exchange switch 602 thus generates an LNP query message containing a telephony service identifier associated with the called party for the call and transmits this to intercept node 608 in step 6b.

Intercept node 608 determines whether the telephony line identified in the LNP query is associated with an enhanced telephony services user by looking for corresponding entries in a store (not shown) containing enhanced telephony service identifiers. In this case, a match is found in the store which corresponds to the telephony service identifier contained in the LNP query, so the called party for the call is indeed an enhanced telephony service user. Intercept node 608 informs originating local telephone exchange switch 602 of such in step 6c by identifying a location in the network where enhanced telephony services may be applied to the call, i.e. enhanced services node 610. Originating local telephone exchange switch 602 then contacts enhanced services node 610 in step 6d, which in turn provides enhanced services for the call in step 6e.

Figure 7:
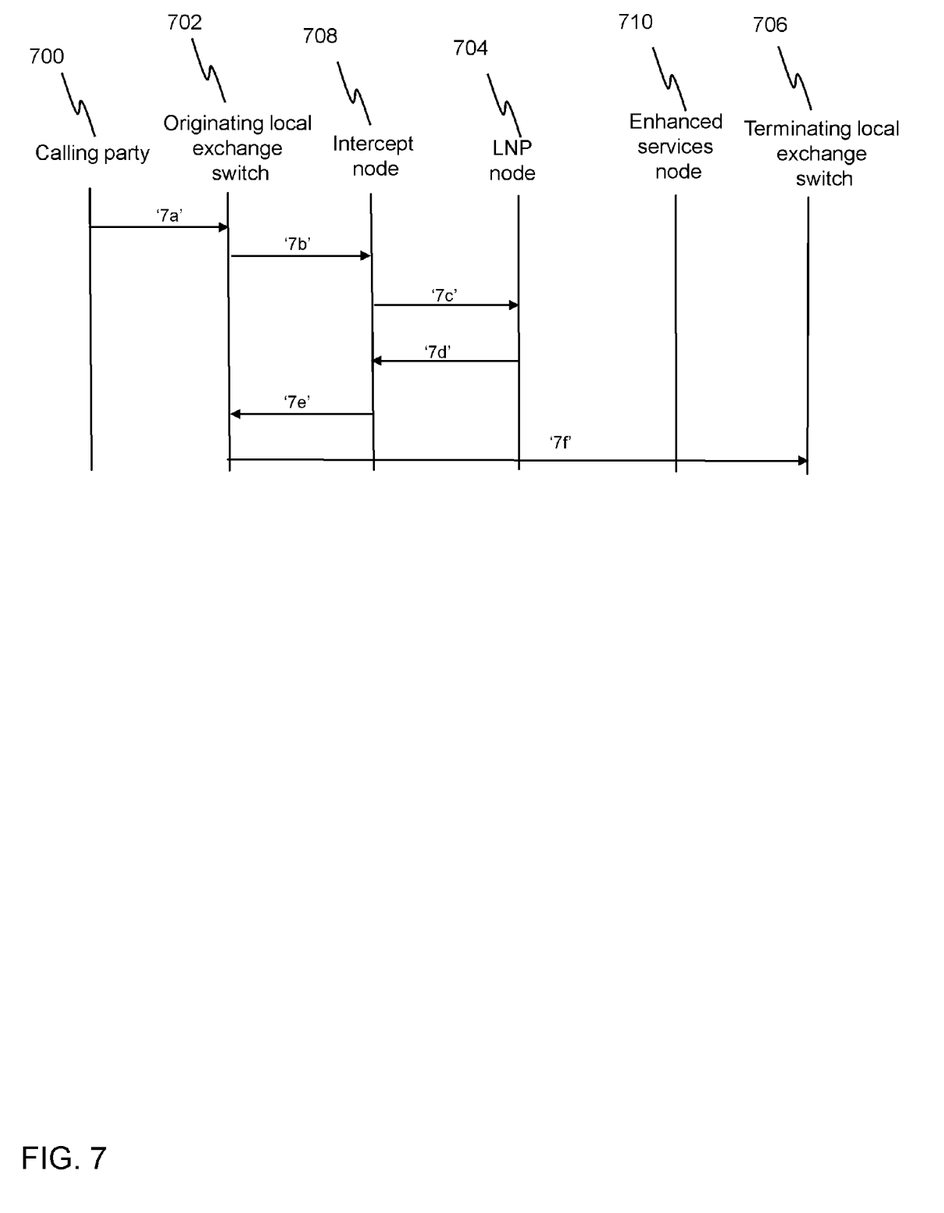
FIG. 7 is a signaling flow diagram showing a call processing procedure according to an embodiment of the present invention.

FIG. 7 is a signaling flow diagram showing a call processing procedure according to an embodiment of the present invention. This embodiment involves enhanced telephony services being applied to an originating call.

When a calling party 700 makes a call, signaling information for the call is received at originating local telephone exchange switch 702, as shown by step 7a. Originating local telephone exchange switch 702 is configured to generate LNP queries for all calls it processes and to send such queries to intercept node 708. Originating local telephone exchange switch 702 thus generates an LNP query message containing a telephony service identifier associated with the called party for the call and transmits this to intercept node 708 in step 7b. Intercept node 708 determines whether the telephony line identified in the LNP query is associated with an enhanced telephony services user by looking for corresponding entries in a store (not shown) containing enhanced telephony service identifiers. In this case, no match is found in the store which corresponds to the telephony service identifier contained in the LNP query, so the called party for the call is not an enhanced telephony service user. Intercept node 708 therefore passes the LNP query on to LNP node 704 in step 7c.

LNP node 704 determines how the call for the telephony line identified in the LNP query should be routed by accessing LNP database (not shown) and searching for corresponding entries. LNP node 704 transmits a suitable LNP response message to intercept node 708 in step 7d which is passed on to originating local telephone exchange switch 702 in step 7e. When originating local telephone exchange switch 702 receives the LNP response, originating local telephone exchange switch 702 and any intermediate switches (not shown) are able to route the call to terminating local telephone exchange switch 706 which serves the called party for the call, as shown in step 7f.

In an alternative embodiment of the present invention, LNP node 704 sends an LNP response message directly back to originating local telephone exchange switch 702 in a single step, instead of via intercept node 708.

Figure 8:
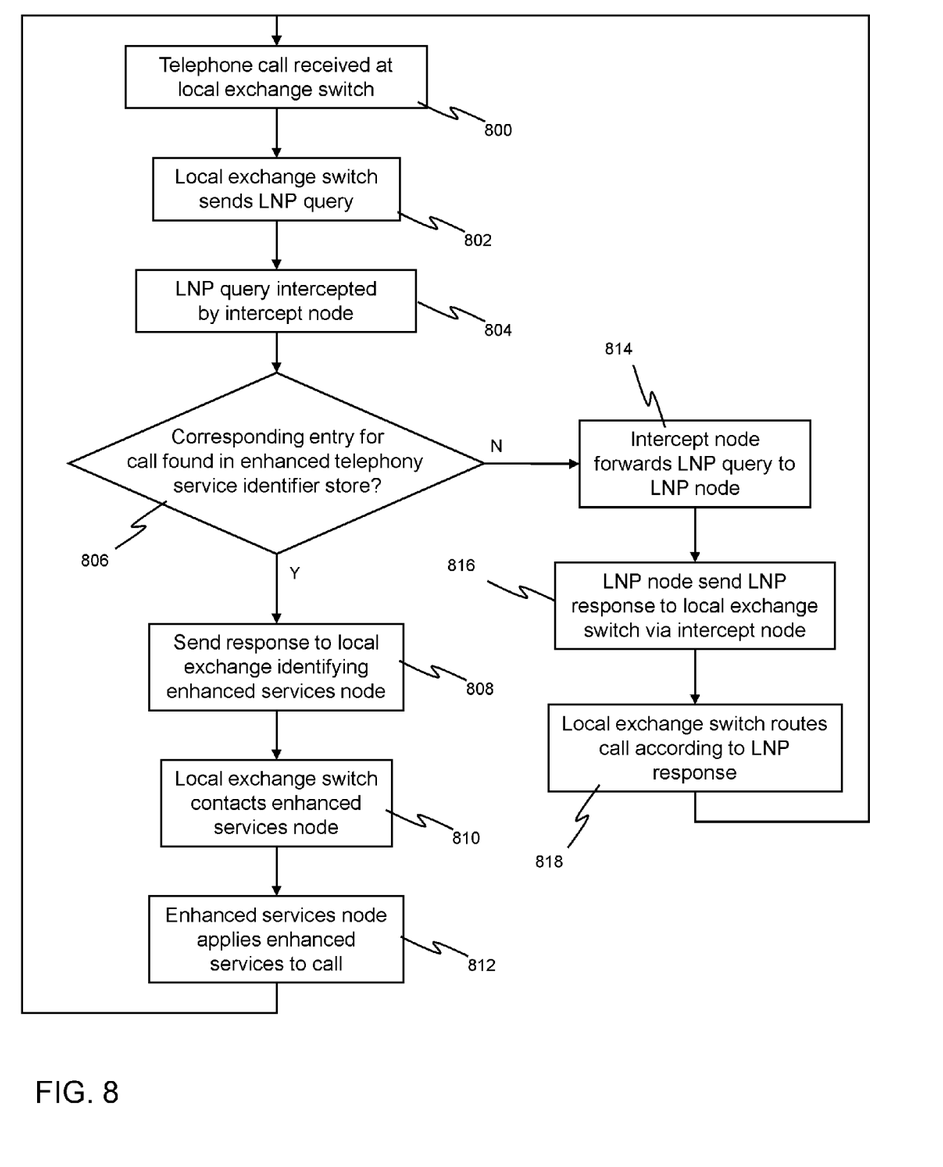
FIG. 8 is a flow chart showing call processing steps according to embodiments of the present invention.

FIG. 8 is a flow chart showing call processing steps according to embodiments of the present invention. The process begins when a telephone call is received at an originating local telephone exchange switch located in a telecommunications network in step 800. In this embodiment, the originating local telephone exchange switch is configured to generate an LNP query for each telephone call it receives and accordingly generates an LNP query containing a telephony service identifier associated with the received telephone call. The LNP is transmitted into the telecommunications network in step 802 to an address where the originating local telephone exchange switch believes that an LNP node responsible for processing such LNP queries is located. However, the originating local telephone exchange switch is actually configured to transmit LNP queries to an intercept node, so that the intercept node intercepts the LNP query in step 804 and processes it instead of the LNP node.

The intercept node proceeds to search a store of enhanced telephony service identifiers for identifiers corresponding to the telephony service identifier contained in the LNP query which is associated with the received telephone call in step 806.

If a corresponding entry is found in the store of enhanced telephony service identifiers, the intercept node sends a response to the originating local telephone exchange switch in step 808 identifying a location in the network where enhanced telephony services may be applied to the call. This may involve sending a network address of an enhanced services node to the originating local telephone exchange switch. The originating local telephone exchange switch is then able to contact the enhanced services node, as shown in step 810, which then applies enhanced telephony services to the call in step 812.

If no corresponding entry is found in the store, then the intercept node forwards the LNP query in step 814 on to an LNP node in the network which is responsible for processing LNP queries. The LNP node processes the LNP query, searches a database containing details of ported telephone numbers and transmits an LNP response in step 816 to the originating local telephone exchange switch via the intercept node in step 816. The LNP response contains data informing the originating local telephone exchange switch whether the telephony service identifier has been ported or not, in response to which the originating local telephony exchange switch routes the call accordingly in step 818.

In alternative embodiments of the present invention, the LNP node may send an LNP response directly back to originating local telephone exchange switch instead of via the intercept node in step 816.

Figure 9:
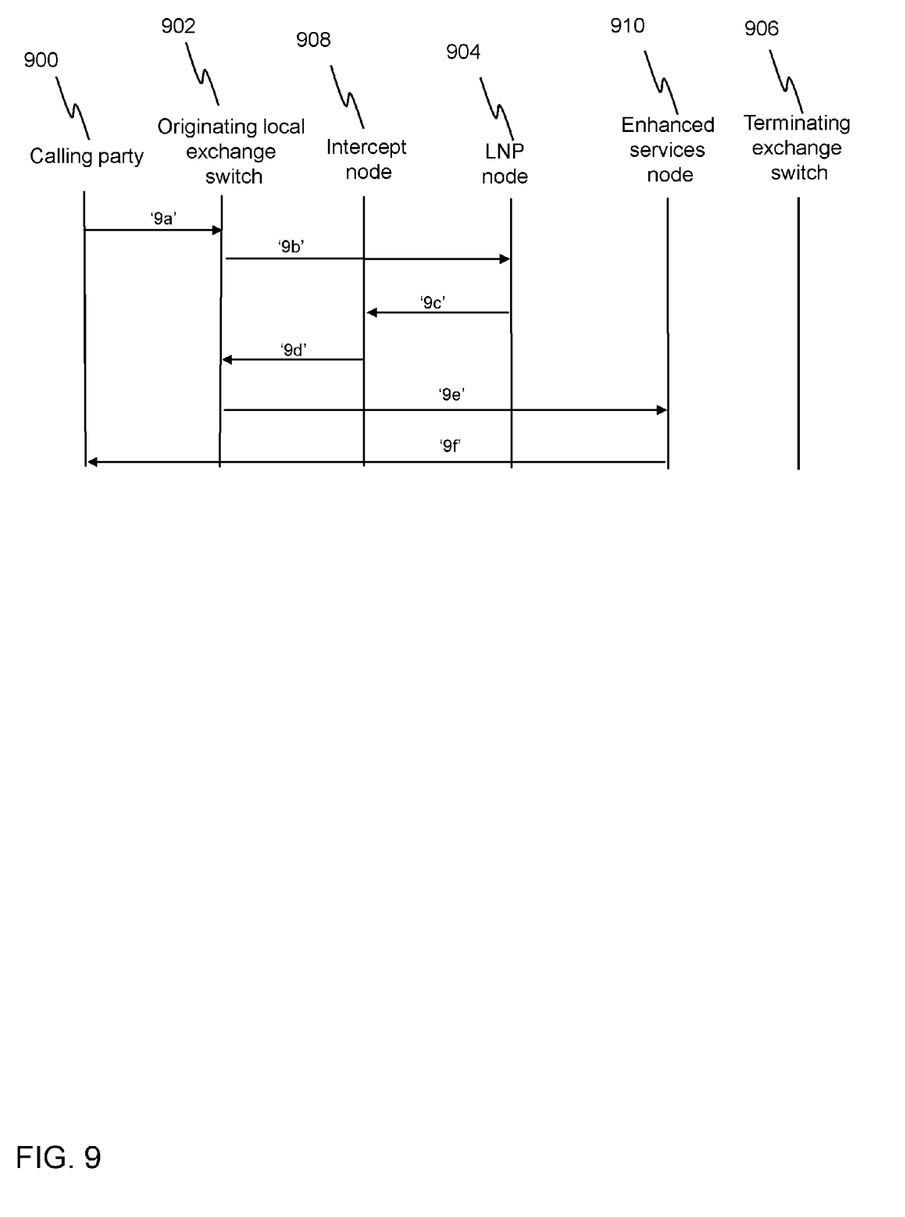
FIG. 9 is a signaling flow diagram showing a call processing procedure according to an embodiment of the present invention.

FIG. 9 is a signaling flow diagram showing a call processing procedure according to an embodiment of the present invention. This embodiment involves enhanced telephony services being applied to an originating call. In this embodiment of the present invention, an intercept node intercepts LNP responses on their way back from the LNP node instead of intercepting LNP queries on their way to the LNP node.

When a calling party 900 makes a call, signaling information for the call is received at originating local telephone exchange switch 902, as shown by step 9a. Originating local telephone exchange switch 902 is configured to generate LNP queries for all calls it processes and to send such queries to LNP node 904. In response to receiving signaling information for the call in step 9a, originating local telephone exchange switch 902 generates an LNP query message containing a telephony service identifier associated with the call and transmits this to LNP node 904 in step 9b.

LNP node 904 determines how calls for the telephony line identified in the LNP query should be routed by accessing an LNP database (not shown) and searching for corresponding entries. LNP node 904 is configured to send LNP responses to a network address associated with intercept node 908 and transmits a suitable LNP response message to intercept node 908 in step 9c.

Intercept node 908 determines whether the telephony line identified in the LNP response is associated with an enhanced telephony services user by looking for corresponding entries in a store (not shown) containing enhanced telephony service identifiers. In this case, a match is found in the store which corresponds to the telephony service identifier contained in the LNP response, so enhanced telephony services should be applied to the call. In step 9d, intercept node 908 informs originating local telephone exchange switch 902 of a location in the network where enhanced telephony services may be applied to the call, i.e. enhanced services node 910. Originating local telephone exchange switch 902 contacts enhanced services node 910 in step 9e, which in turn provides enhanced services to the call in step 9f.

Figure 10:
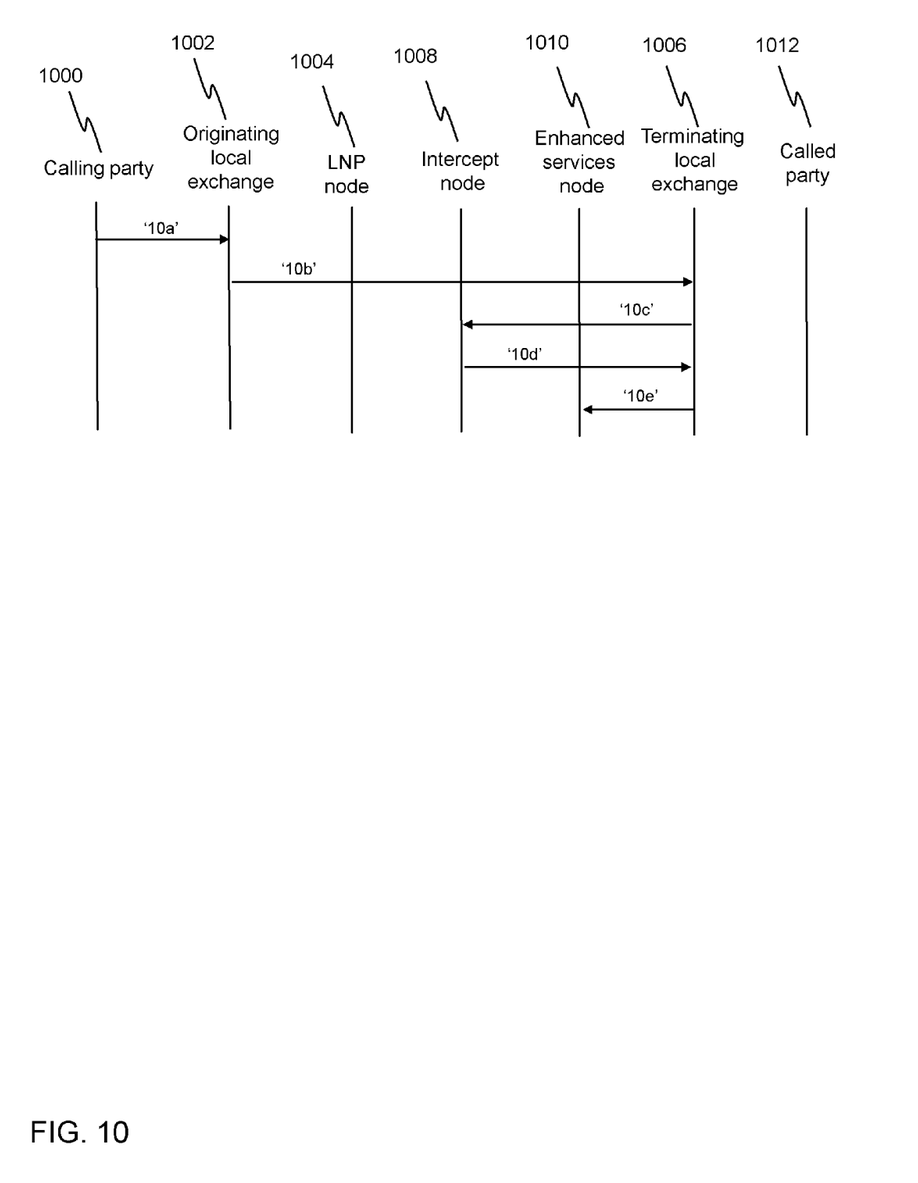
FIG. 10 is a signaling flow diagram showing a call processing procedure according to an embodiment of the present invention.

FIG. 10 is a signaling flow diagram showing a call processing procedure according to an embodiment of the present invention. This embodiment involves enhanced telephony services being applied to a terminating call, i.e. an inbound call to called party 1012.

Calling party 1000 places a call to a party 1012 served by terminating local exchange switch 1006 in step 10a. Originating local exchange switch 1002 performs call setup to terminating local exchange switch 1006 in step 10b. Terminating local exchange switch 1006 sends an LNP query to intercept node 1008 in step 10c. Intercept node 1008 establishes that the called party matches the identity of a recipient of enhanced terminating services, and sends an LNP response to terminating local exchange 1006 in step 10d that includes a LRN that identifies the enhanced services node 1010. Terminating local exchange switch 1006 interprets the LNP query response as a request to route the call to enhanced services node 1010, and performs such routing in step 10e.

Figure 11:
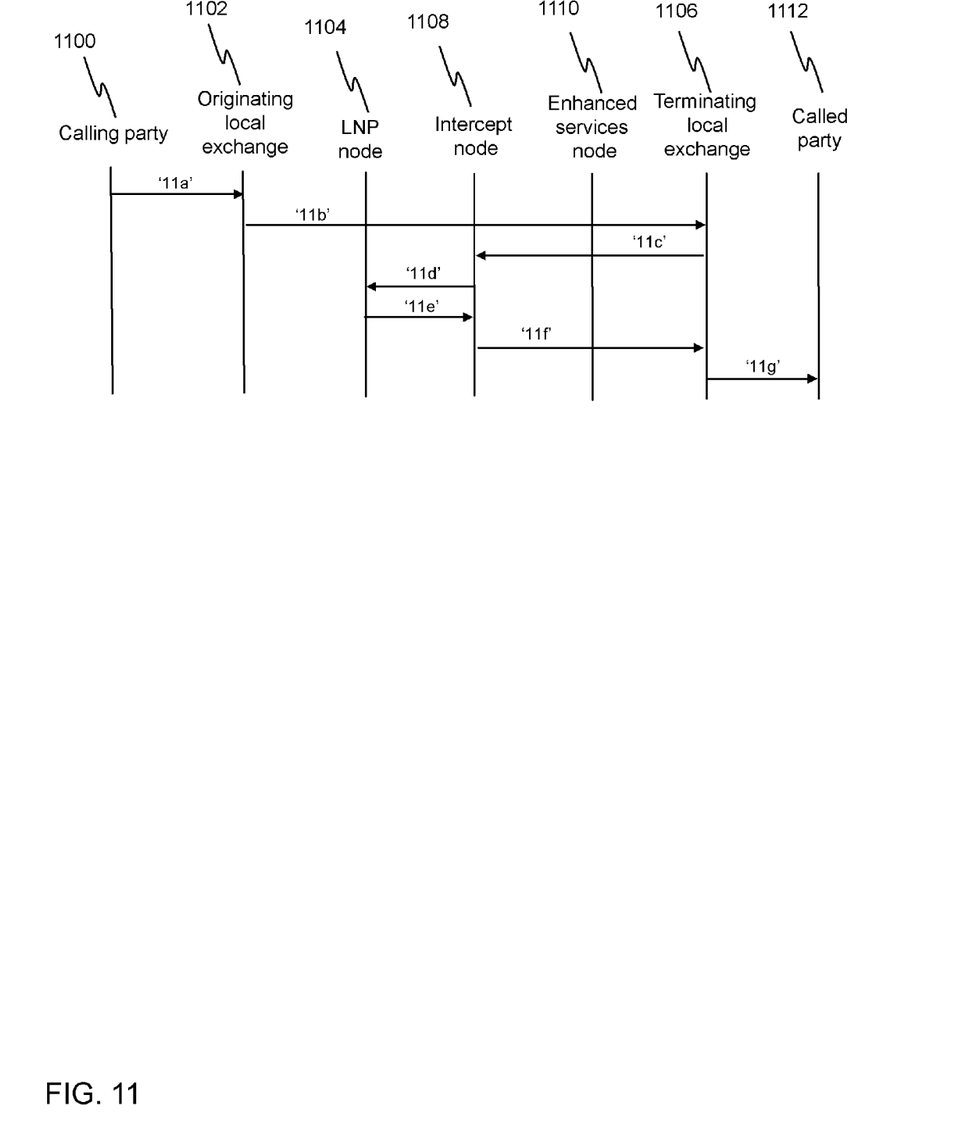
FIG. 11 is a signaling flow diagram showing a call processing procedure according to an embodiment of the present invention.

FIG. 11 is a signaling flow diagram showing a call processing procedure according to an embodiment of the present invention. This embodiment involves enhanced telephony services not being applied to a terminating call and the call being routed to called party 1112.

Calling party 1100 places a call to a party 1112 served by terminating local exchange switch 1106 in step 11a. Originating local exchange switch 1102 performs call setup to terminating local exchange switch 1106 in step 11b. Terminating local exchange switch 1106 sends an LNP query to intercept node 1108 in step 11c. Intercept node 1108 establishes that called party 1112 does not match the identity of a recipient of enhanced terminating services, and sends an LNP query to LNP node 1104 in step 11d. LNP node 1104 responds with a normal LNP response, in this case indicating "number not ported" in step 11e. Intercept node 1108 forwards an LNP response to terminating local exchange switch 1106 in step 11f. Terminating local exchange switch 1106 interprets the LNP response as a request to complete the call to called party 1112 as normal, and does so accordingly in step 11g.

Figure 12:
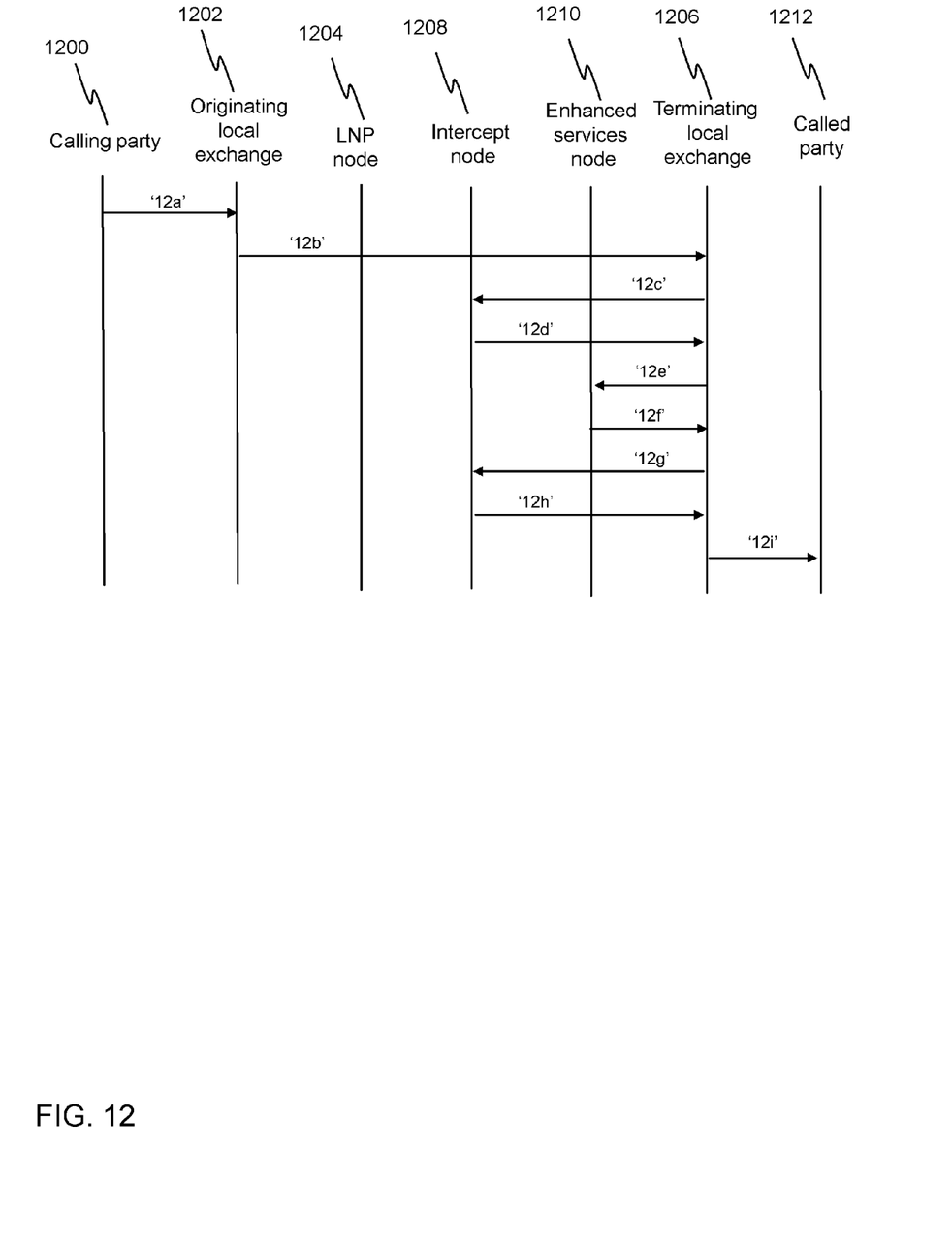
FIG. 12 is a signaling flow diagram showing a call processing procedure according to an embodiment of the present invention.

FIG. 12 is a signaling flow diagram showing a call processing procedure according to an embodiment of the present invention. This embodiment involves enhanced telephony services being applied to a terminating call where the call is routed to an enhanced services node and subsequently to called party 1212.

Steps 12a to 12e are the same as those described for steps 10a to 10e in FIG. 10 above. Enhanced services node 1210 applies enhanced telephony services, determines that the call should be connected as normal to the called party, and routes the call to terminating local exchange switch 1206 in step 12f. Terminating local exchange switch 1206 sends an LNP query to intercept node 1208 in step 12g. Intercept node 1208 determines from the identifying information in the LNP query that it has already handled this call, so sends an LNP response to terminating local exchange switch in step 12h indicating "number not ported." Terminating local exchange 1206 completes the call to called party 1212 in step 12i.

The above embodiments are to be understood as illustrative examples of the invention. Further embodiments of the invention are envisaged.

For example the functions of the intercept node and the LNP node may be combined into a single node in the network. This may involve enhancing an existing LNP node to add the necessary functionality for detecting enhanced telephony service users and for controlling and providing enhanced telephony services when calls to and from such enhanced telephony service users are detected.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of providing an enhanced telephony service in a telecommunications network, the method comprising:
   maintaining a store of identifiers for enhanced telephony service users in the network;
   configuring a local telephone exchange switch to generate number portability queries for telephone calls received thereby;
   further configuring the local telephone exchange switch to alter a network address to where the local telephone exchange switch transmits number portability queries, the altered network address being associated with a number portability intercept node;
   receiving, at the number portability intercept node, a number portability query relating to a first telephone call in the network, the number portability query comprising a first identifier for the first telephone call, the number portability query being received from the configured local telephone exchange switch;
   searching the store for an identifier corresponding to the first identifier to identify a user of an enhanced telephony service; and
   in response to the searching identifying a user of an enhanced telephony service, instructing, at the number portability node, routing of the first telephone call to a first network node in the network responsible for the provision of a first enhanced telephony service, the first network node being different from the configured local telephone exchange switch and the number portability intercept node, and the first enhanced telephony service being a service other than a number portability service.

2. The method of claim 1, wherein the instructing comprises generating a second message identifying the first node in the network where the first enhanced telephony service can be provided.

3. The method of claim 1, further comprising in response to the searching not identifying a user of an enhanced telephony service, transmitting a number portability query to a node in the network capable of processing number portability queries to identify number portability service users.

4. The method of claim 1, wherein the first telephone call is an incoming call and the first identifier is associated with the called party for the call.

5. The method of claim 1, wherein the first telephone call is an outgoing call and the first identifier is associated with the calling party for the call.

6. The method of claim 1, wherein one or more of the first identifier and the store of identifiers comprise a telephone dialing number.

7. The method of claim 1, further comprising in response to the searching identifying a user of an enhanced telephony service, instructing routing of the first telephone call to a second node in the network for the provision of a second enhanced telephony service.

8. The method of claim 1, wherein the enhanced telephony service comprises one or more of: call forwarding, call rejection, selective call forwarding, selective call rejection, selective call acceptance, call screening, incoming call notification, simultaneous ring, find me/follow me, and, customized ringback tones.

9. A system for providing an enhanced telephony service in a telecommunications network, the system comprising at least one network server adapted to perform the method of claim 1.

10. A method for providing an enhanced telephony service in a telecommunications network comprising a local telephone exchange switch capable of interworking with a telephone call control node remote to the local telephone exchange switch according to an existing interworking function, the method comprising:
- maintaining a store of identifiers for enhanced telephony service users in the network;
- reconfiguring the existing interworking operation to include an additional enhanced telephony service initiation function;
- in response to receiving a telephone call at the local telephone exchange switch, triggering the reconfigured interworking operation;
- during the reconfigured interworking operation, searching the store for an identifier corresponding to the received telephone call to identify a user of an enhanced telephony service;
- in response to the searching identifying a user of an enhanced telephony service, instructing routing of the received telephone call to a node in the network responsible for providing an enhanced telephony service.

11. A method of providing an enhanced telephony service and a number portability service in a telecommunications network, the method comprising:
- generating, at a local telephone exchange switch, a number portability query including a destination network address;
- altering, at the local telephone exchange switch, the destination network address to a network address associated with a number portability intercept node;
- receiving, at the number portability intercept node, a message caused by the number portability query, the message identifying a user;
- identifying whether the user is registered to receive the enhanced telephony service;
- if the user is so registered, providing the enhanced telephony service;
- if the user is not so registered, providing the number portability service.

12. A non-transitory computer readable medium comprising computer-executable instructions stored thereon, which, when executed, cause a computing device to perform the method of claim 1.

13. A non-transitory computer readable medium comprising computer-executable instructions stored thereon, which, when executed cause a computing device to perform a method of providing an enhanced telephony service in a telecommunications network comprising a local telephone exchange switch capable of interworking with a telephone call control node remote to the local telephone exchange switch according to an existing interworking function, the method comprising:
- maintaining a store of identifiers for enhanced telephony service users in the network;
- reconfiguring the existing interworking operation to include an additional enhanced telephony service initiation function;
- in response to receiving a telephone call at the local telephone exchange switch, triggering the reconfigured interworking operation;
- during the reconfigured interworking operation, searching the store for an identifier corresponding to the received telephone call to identify a user of an enhanced telephony service;
- in response to the searching identifying a user of an enhanced telephony service, instructing routing of the received telephone call to a node in the network responsible for providing an enhanced telephony service.

* * * * *